(12) United States Patent
Tian et al.

(10) Patent No.: US 9,564,677 B2
(45) Date of Patent: Feb. 7, 2017

(54) MOBILE TERMINAL

(75) Inventors: Shoudong Tian, Beijing (CN); Gang Yan, Beijing (CN); Shaolian Liu, Beijing (CN); Rong Zhang, Beijing (CN); Zhijun Gao, Beijing (CN)

(73) Assignees: BEIJING LENOVO SOFTWARE LTD., Haidian District, Beijing (CN); LENOVO (BEIJING) CO., LTD., Haidian District, Beijing (CN)

( * ) Notice: Subject to any disclaimer, the term of this patent is extended or adjusted under 35 U.S.C. 154(b) by 185 days.

(21) Appl. No.: 13/518,931

(22) PCT Filed: Dec. 16, 2010

(86) PCT No.: PCT/CN2010/079865
§ 371 (c)(1),
(2), (4) Date: Jun. 25, 2012

(87) PCT Pub. No.: WO2011/076080
PCT Pub. Date: Jun. 30, 2011

(65) Prior Publication Data
US 2012/0262347 A1 Oct. 18, 2012

(30) Foreign Application Priority Data

Dec. 23, 2009 (CN) .................... 2009 2 0278248 U
Dec. 31, 2009 (CN) .................... 2009 2 0350859 U

(51) Int. Cl.
*H01Q 1/24* (2006.01)
*H01Q 1/40* (2006.01)
(Continued)

(52) U.S. Cl.
CPC ................ *H01Q 1/243* (2013.01); *H01Q 1/40* (2013.01); *H01Q 1/42* (2013.01); *H01Q 5/364* (2015.01); *H01Q 9/42* (2013.01); *H04M 1/0249* (2013.01)

(58) Field of Classification Search
CPC ............ H01Q 1/38; H01Q 1/243; H01Q 1/26; H01Q 9/0407
(Continued)

(56) References Cited

U.S. PATENT DOCUMENTS 6,333,716 B1 * 12/2001 Pontoppidan .................. 343/702
6,486,837 B2 * 11/2002 Spiegel et al. ................ 343/702
(Continued)

FOREIGN PATENT DOCUMENTS

CN 201072804 Y 6/2008
CN 201594838 U 9/2010
(Continued)

OTHER PUBLICATIONS

International Preliminary Report on Patentability for PCT/CN2010/079865, dated Jun. 26, 2012 (9 pages).
(Continued)

*Primary Examiner* — Sue A Purvis
*Assistant Examiner* — Daniel J Munoz
(74) *Attorney, Agent, or Firm* — Brinks Gilson & Lione; G. Peter Nichols

(57) ABSTRACT

A mobile terminal and an antenna thereof are provided. The mobile terminal includes a housing, a main board arranged within said housing, and an antenna arranged on the outer surface of said housing such that the antenna is connected with said main board. The height of the mobile phone antenna can be effectively increased and, thus the performance of the antenna is improved.

20 Claims, 5 Drawing Sheets

(51) Int. Cl.
*H01Q 1/42* (2006.01)
*H01Q 9/42* (2006.01)
*H01Q 5/00* (2015.01)
*H01Q 5/364* (2015.01)
*H04M 1/02* (2006.01)

(58) Field of Classification Search
USPC .......................................... 343/700 MS, 702
See application file for complete search history.

(56) References Cited

U.S. PATENT DOCUMENTS

| | | | |
|---|---|---|---|
| 6,885,347 B2* | 4/2005 | Zheng et al. ................ | 343/702 |
| 2003/0122726 A1* | 7/2003 | Abbasi et al. ................ | 343/846 |
| 2004/0201530 A1* | 10/2004 | Wen et al. ................... | 343/725 |
| 2007/0241971 A1* | 10/2007 | Tsujimura et al. ........... | 343/702 |
| 2008/0001833 A1* | 1/2008 | Kaneoya ..................... | 343/702 |
| 2009/0153423 A1* | 6/2009 | Dinallo et al. ............... | 343/767 |

FOREIGN PATENT DOCUMENTS

| | | |
|---|---|---|
| CN | 201629392 U | 11/2010 |
| JP | 2008099024 A | 4/2008 |

OTHER PUBLICATIONS

International Search Report for PCT/CN2010/079865, dated Mar. 24, 2011, 5 pages.

* cited by examiner

MOBILE TERMINAL

TECHNICAL FIELD

The present invention relates to communication product technical field, and particularly to a mobile terminal and antenna thereof.

BACKGROUND

With a raise of living standard, requirements for a mobile terminal such as a mobile phone by people are higher and higher. An antenna of the mobile terminal is an important component in the mobile terminal and its quality is an important index of the mobile terminal's performance.

A common-used form of the antenna in currently mobile terminals is Planner Inverted-F Antenna (PIFA). The PIFA antenna has strict demands for area and height.

A common-used design method nowadays is to dispose the PIFA antenna inside a housing of the mobile terminal, that is, use an embedded antenna schema.

Recently, the mobile terminal is hoped to be miniaturized for being carried conveniently. Therefore, the mobile terminal is now designed to be thinner and thinner and a space inside the housing of the mobile terminal is smaller and smaller, which is difficult to satisfy a design requirement that the height of the antenna should be or above 6.5 mm.

SUMMARY

A technical problem to be settled by embodiments of the present invention is to provide a mobile terminal which may increase the height of the antenna in the mobile terminal effectively.

Another technical problem to be settled by embodiments of the present invention is to provide an antenna and mobile terminal, which may increase a radiation efficiency of the antenna, so that a requirement of 30% for the radiation efficiency of the antenna is satisfied while the height size of the antenna is smaller than 7 mm.

The embodiment of the present invention provides a mobile terminal comprising: a housing; a main board arranged inside the housing; and an antenna arranged on outer surface of the housing, the antenna is connected with the main board.

Preferably, a through-hole is arranged on the housing and the position of the through-hole corresponds to that of an antenna feed point, and the antenna is connected to a communication module on the main board through the through-hole.

Preferably, the antenna is formed by hollow carving an outer surface of the housing when the housing is metal.

Preferably, the antenna is formed by electroplating the outer surface of the housing when the housing is non-metal.

Preferably, a groove with a shape of the antenna is injection-molded on the outer surface of the housing and the antenna is inlayed into the groove, when the housing is non-metal.

Preferably, a covering film is arranged on the outer surface of the antenna.

Preferably, paint is sprayed to the outer surface of the antenna.

Preferably, the covering film is stuck to the outer surface of the antenna by insert mold bonding.

Preferably, a thickness of the covering film is 0.2 mm-0.25 mm.

Preferably, material for the covering film is a polycarbonate, a polyethylene glycol two ester or a polyurethane.

Preferably, the antenna comprises: a radiating body including a first radiating part, a second radiating part and a connection part, wherein a first terminal of the connection part is connected to the first radiating part, a second terminal of the connection part is connected to the second radiating part, and the connection part is slotted to form a gap for spreading width of frequency band; a ground part arranged on the radiating body; a power feeding part arranged on the radiating body; and a reference ground connected with the ground part.

Preferably, the antenna further comprises a resonance branch and one terminal of the resonance branch is connected to the radiating body.

Preferably, the resonance branch is connected to the first radiating part.

Preferably, the resonance branch is a match resonance branch of 1800 MHz.

Preferably, the gap extends into the first radiating part and the second radiating part, and one terminal of the gap bends in the first radiating part while the other terminal of the gap bends in the second radiating part.

Preferably, the radiating body has a shape of concaveness.

The embodiment of the present invention further provides a mobile terminal comprising a housing, a reference ground and a wireless module for providing and processing wireless signals which are arranged inside the housing, respectively. The mobile terminal further comprises an antenna arranged on the housing, which is connected with the wireless module, wherein the antenna comprises: a radiating body including a first radiating part, a second radiating part and a connection part, a first terminal of the connection part is connected to the first radiating part, a second terminal of the connection part is connected to the second radiating part, and the connection part is slotted to form a gap for spreading width of frequency band; a ground part connected with the radiating body, and the reference ground is connected with the ground part; and a power feeding part connected with the radiating body, and the wireless module is connected to the radiating body through the power feeding part.

Preferably, the antenna further comprises a resonance branch and one terminal of the resonance branch is connected to the radiating body.

Preferably, the resonance branch is a match resonance branch of 1800 MHz.

Preferably, the gap extends into the first radiating part and the second radiating part, and one terminal of the gap bends in the first radiating part while the other terminal of the gap bends in the second radiating part.

The embodiment of the present invention further provides a mobile terminal comprising: a housing; a wireless module arranged inside the housing, which used for providing and processing wireless signals; an antenna arranged on an outer surface of the housing, which is connected with the wireless module, wherein the antenna comprises: a first resonance part; a second resonance part; a connection part which is connected with the first resonance part and the second resonance part; a power feeding part connected with the first resonance part; a ground part connected with the second resonance part; and a reference ground connected with the ground part.

Preferably, a second gap which is hollow and used for spreading width of frequency band is arranged on the connection part.

The embodiments of the present invention have advantages as follows, as compared with the prior art.

In the prior art, the height of the antenna in the mobile terminal is low due to restrictions on structure of the mobile terminal per se and limited space, and the antenna is surrounded by a metal structure which causes a low radiation efficiency of the antenna. For example, the height of the antenna in the mobile terminal is generally only 5~7 mm, the entire surface of the antenna is metal and the antenna is close to a SIM (Subscriber Identity Module) slot and a speaker which are made of metal, such that a basic requirement of 30% for the radiation efficiency of the antenna could not be reached, and both transmitting and receiving effects of the antenna are poor. As compared with the prior art, the mobile terminal provided by the embodiment of the present invention arranges the antenna of the mobile terminal on the outer surface of the housing in the mobile terminal, so that the height of the antenna in the mobile terminal can be provided effectively and in turn the performance of the antenna is improved.

Further, the first method for increasing the radiation efficiency of the antenna in the prior art is to increase a size of the height of the antenna so as to increase the height of the antenna, but the first method would destroy an original appearance and structure.

The second method uses the PIFA antenna (Planner Inverted-F Antenna) above-described or a MONO-POLE antenna and adjusts a match circuit. However, due to characters in structures of the PIFA or MONO-POLE per se, the antenna in the second method has a height below 5~7 mm and the radiation efficiency of the antenna also fails to reach the requirements. Therefore, the requirement of 30% for the radiation efficiency of the antenna could not be satisfied when the height size is 5~7 mm by using the antenna structure in the prior art. The embodiments of the present invention have advantages as follows, as compared with the prior art.

1. By arranging the gap for spreading the width of frequency band in the radiating body of the antenna, the gap may increase a current path of an induced current in the radiating body, which increases a frequency width of the antenna effectively.

2. Both terminals of the gap may bend in the first radiating part and the second radiating part, respectively, so that there is a Common Mode (CM) radiation at 900 MHz in the antenna, while a Differential Mode (DM) radiation at 1800 MHz. Further, a resonance circuit is arranged at one side of the radiating body, for example, by arranging a match resonance branch of 1800 MHz connected with the first radiating part, so that an antenna matching depth of the antenna is increased throughout a high frequency band of 1710~2170 MHz, thus the requirement of 30% for the radiation efficiency of the antenna could be satisfied even when the height size of the antenna is smaller than 7 mm.

3. In a case that the radiation efficiency of the antenna reaches to 30%, a scope of the frequency band of the antenna may be up to 820~960 MHz and 1710~2170 MHz, so that a mobile terminal equipped with the antenna may be applicable to all of existing 3G frequency band in the world and the mobile terminal may realize a global usage indeed.

DETAILED DESCRIPTION

In order to make the above objects, features and advantages of the present invention being more apparent, particular implementations of the present invention will be described in details in connection with drawings.

Figure 1:
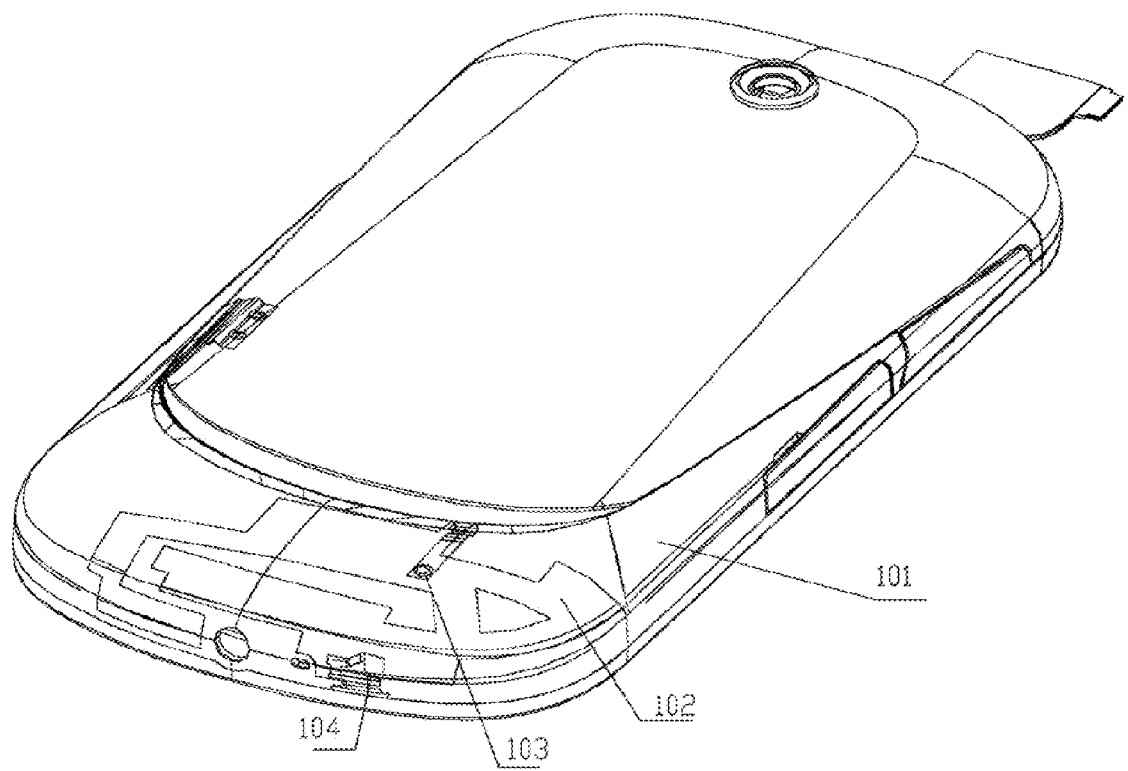
FIG. 1 is a schematic view illustrating a mobile device provided by a first embodiment of the present invention.

Referring FIG. 1 which is a schematic view illustrating a first embodiment of mobile device provided by the present invention.

The mobile device provided by this embodiment comprises: a housing 101; a main board (not shown in FIG. 1) arranged inside the housing; and an antenna 102 arranged on outer surface of the housing, the antenna 102 is connected with the main board.

The antenna 102 of the mobile device provided by this embodiment is arranged on the outer surface of the housing 101 of the mobile device. Thus, the height of the antenna is provided effectively and in turn the performance of the antenna is improved, as compared with the antenna arranged inside a housing of the mobile device in the prior art.

It is understand that the antenna needs to perform a signal communication with the main board. Therefore, a through-hole is arranged on the housing, such as the through-hole 103 in FIG. 1. The position of the through-hole 103 corresponds to that of an antenna feed point and the antenna is connected with a communication module on the main board through the through-hole 103. Similarly, a ground of the antenna is connected with a ground of the main board together. Particularly, the ground of the antenna may be introduced inside of the housing via a edge of the housing, such as the ground 104 of the antenna in FIG. 1, and is connected with the ground of the main board together; or a through-hole may also be arranged at position corresponding to the ground of the antenna on the housing, and the ground of the antenna is introduced inside of the housing through the through-hole and connected with the ground of the main board together.

It need note that the housing 101 of the mobile device may be metal or non-metal (for example, plastic). Below will explain how to form the antenna when the housing is metal and non-metal, respectively.

1. The Housing is Metal

The antenna is formed by hollow carving the outer surface of the housing in accordance with a predetermined shape of the antenna, when the housing is metal.

2. The Housing is Non-metal

The antenna is formed by electroplating the outer surface of the non-metal housing (that is, a plastic housing) in accordance with the predetermined shape of the antenna, when the housing is non-metal (for example, plastic). Of course, a groove may be injection-molded on the outer surface of the non-metal housing in accordance with the predetermined shape of the antenna and the antenna is inlayed into the groove.

Figure 2:
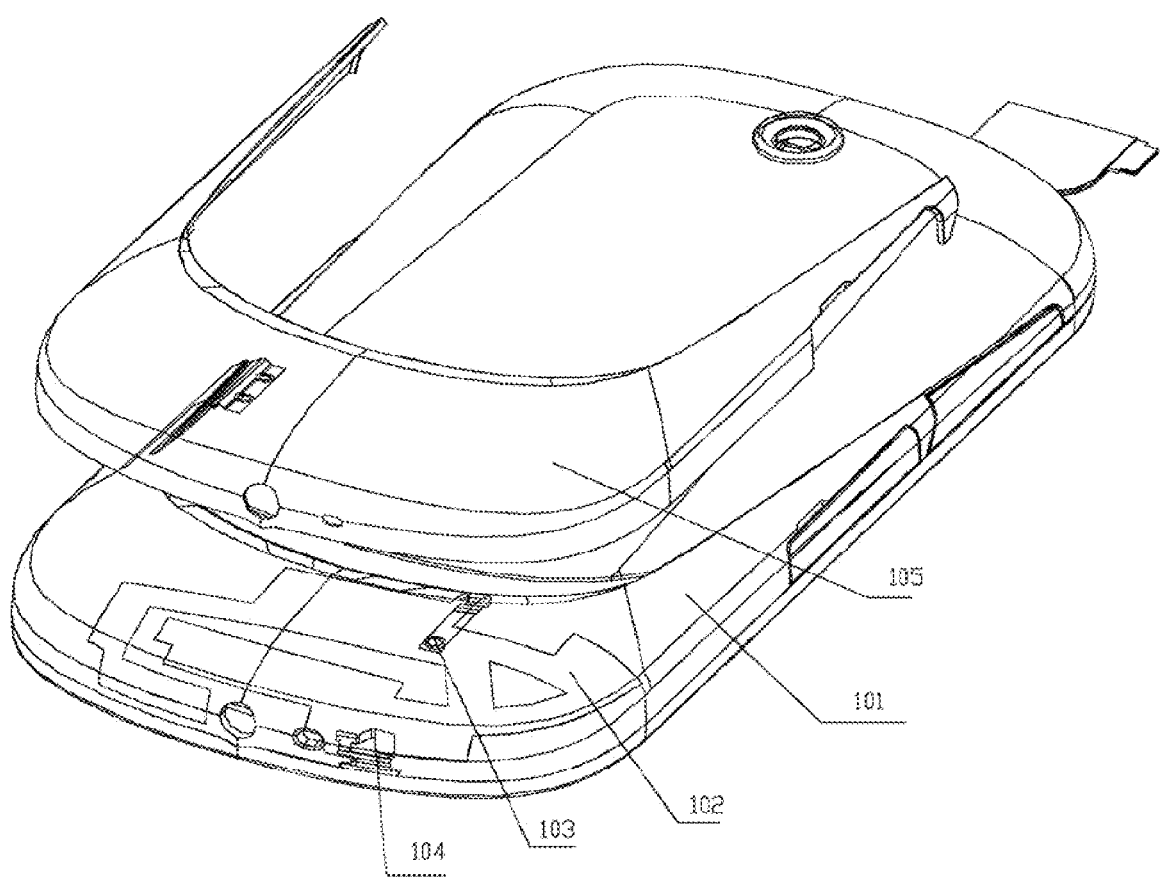
FIG. 2 is a schematic view illustrating a mobile device provided by a second embodiment of the present invention.

Referring to FIG. 2 which is a schematic view illustrating a mobile device provided by a second embodiment of the present invention.

A covering film 105 is arranged on the antenna in the mobile device provided by this embodiment.

Whether the housing 101 of the mobile device is metal or non-metal (plastic), the covering film may be arranged on the antenna or paint may be sprayed to antenna so as to cover the uneven on the antenna and the housing, so that the outer surface of the housing is smooth entirely.

Regarding the covering film, the covering film 105 may be formed on a visible surface of the antenna of the mobile device by an insert mold bonding technology and is used to cover the antenna 102 of the mobile device, in order to ensure an elegant appearance of the housing 101 of the mobile device.

With the antenna such formed, the height of the external antenna may be higher than that of the internal antenna in the prior art by 0.85-0.9 mm in a case of same appearance for the mobile phone, so that the performance of the antenna is increased greatly. The performance of the antenna is more superior as its height increases.

A thickness of the covering film may be 0.2 mm-0.25 mm.

Material for the covering film may be a polycarbonate, a polyethylene glycol two ester or a polyurethane (PU).

In the prior art, the height of the antenna in the mobile terminal is low due to restrictions on structure of the mobile terminal per se and limited space, and the antenna is surrounded by a metal structure which causes a low radiation efficiency of the antenna. For example, the height of the antenna in the mobile terminal is generally only 5~7 mm, the entire surface of the antenna is metal and the antenna is close to a SIM (Subscriber Identity Module) slot and a speaker which are made of metal, such that a basic requirement of 30% for the radiation efficiency of the antenna could not be reached, and both transmitting and receiving effects of the antenna are poor. The mobile terminal provided by the embodiment of the present invention arranges the antenna of the mobile terminal on the outer surface of the housing in the mobile terminal, so that the height of the antenna in the mobile terminal may be provided effectively and in turn the performance of the antenna is improved.

It should be note that a specific position of the housing of the mobile device on which the antenna is arranged is not limited to the embodiment of the present invention, and those skilled in the art can design flexibly depending on a detailed shape of the mobile device.

Furthermore, the radiation efficiency of the antenna may also be increased by improving the structure of the antenna without increasing the height of the antenna, other than arranging the antenna of the mobile device on the outer surface of the housing of the mobile device so as to increase the height of the antenna effectively and in turn to increase the performance of the antenna.

In this embodiment, a gap for spreading the width of frequency band is arranged in the radiating body of the antenna, therefore the gap may increase a current path of an induced current in the radiating body, which increases a frequency width of the antenna effectively. Additionally, a resonance circuit may be arranged at one side of the radiating body, so that an antenna matching depth of the antenna is increased throughout a high frequency band of 1710~2170 MHz and the antenna radiation efficiency of the antenna is increased effectively.

Thereafter will describe the structure of the above-described antenna in details in connection with drawings and implementations, in order to let those skilled in the art understand the solutions of the present invention better.

Figure 3:
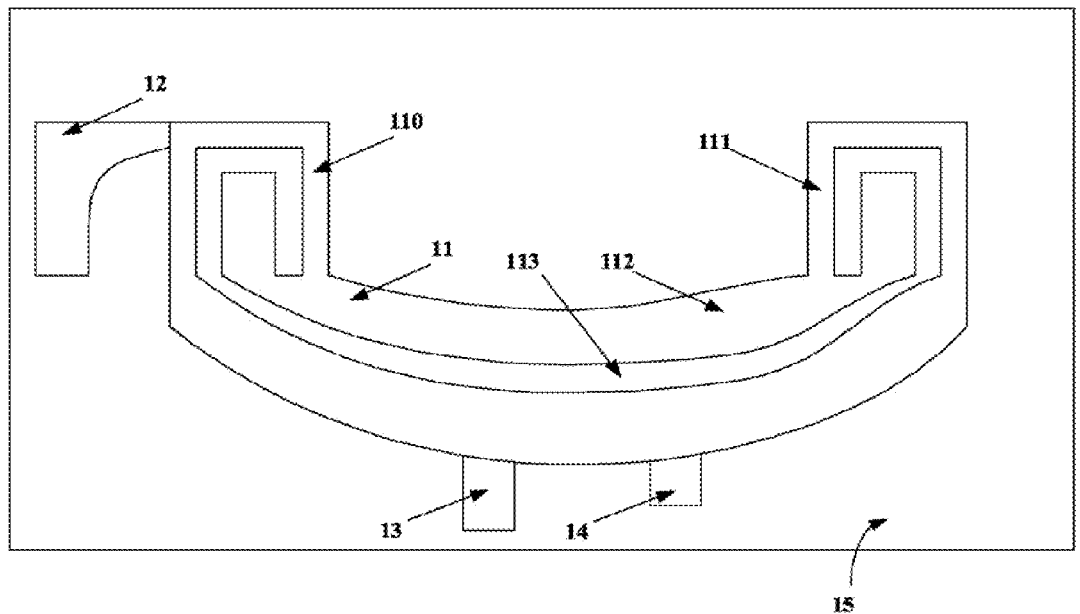
FIG. 3 is schematic view illustrating an antenna expanded in a third embodiment of the present invention.

Referring to FIG. 3 which is schematic view illustrating an antenna expanded in a third embodiment of the present invention, as shown in the figure, the antenna comprises:

a radiating body 11 including a first radiating part 110, a second radiating part 111 and a connection part 112, wherein a first terminal of the connection part 112 is connected to the first radiating part 110, a second terminal of the connection part 112 is connected to the second radiating part 111, and the connection part 112 is slotted to form a gap 113 for spreading width of frequency band; a ground part arranged on the radiating body.

In this embodiment, the radiating body may be configured to have a shape of concaveness. At this time, the first radiating part 110 and the second radiating part 111 are arranged at two terminals of the radiating body 11. Of course, the shape of the radiating body 11 is not limited to this. The connection part 112 is slotted to form a gap 113 by which a current path of an induced current in the radiating body may be increased, so that the frequency wide of a low-profile broadband antenna can be increased effectively, and both of an length and a width of the gap 113 may be decided depending on a requirement for the frequency band and performance of the antenna.

Referring to FIG. 1, the gap further extends into the first radiating part 110 and the second radiating part 111, and the gap 113 may bend both in the first radiating part 110 and the second radiating part 111. On one hand, it increase the current path of an induced current in the radiating body, and on the other hand, it causes a Common Mode (CM) radiation at 900 MHz and a Differential Mode (DM) radiation at 1800 MHz in the low-profile broadband antenna.

a resonance branch 12, one terminal of the resonance branch 12 is connected to the radiating body 11, and the resonance branch 12 and the radiating body 11 are not in a same plane. The resonance branch 12 is used for improving antenna matching and an impedance of the antenna, so that the radiating body 11 is more suitable to radiate.

In this embodiment, the resonance branch 12 may be connected to the first radiating part 110, and the resonance branch 12 may be a match resonance branch of 1800 MHz, so that the antenna matching depth of the antenna is increased throughout a high frequency band of 1710~2170 MHz, the frequency wide of a low-profile broadband antenna can be increased effectively, and the antenna radiation efficiency of the antenna is increased effectively.

a ground part 13 connected with the radiating body 11, one terminal of the ground part 13 is connected to the radiating body 11 and the other terminal of the ground part 13 may be connected to a reference ground 15 of the low-profile broadband antenna;

a power feeding part 14 connected with the radiating body 11; and the reference ground 15 connected with the ground part 14 and closed to the power feeding part 14. When coaxial cables are used to feed power, internal conductors in the coaxial cables are connected to the power feeding part 14, while external conductors therein are connected to a point having a closest distance from the power feeding part 14 on the reference ground 15.

In this embodiment, the power feeding part 14 and the ground part 13 may be connected to the connection part 112, respectively, and both the power feeding part 14 and the ground part 13 may be arranged at the same side of the connection part 112.

Figure 4:
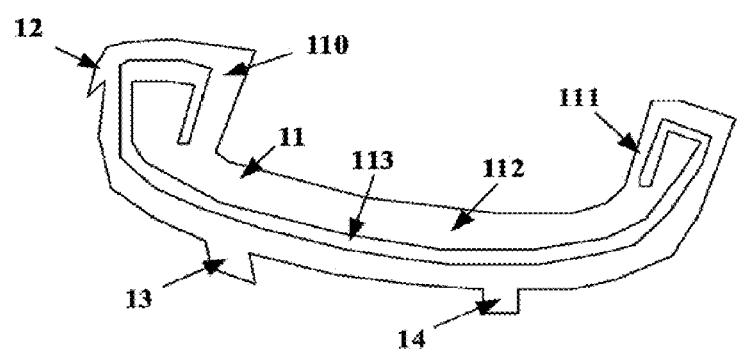
FIG. 4 is a perspective view illustrating the antenna in the third embodiment of the present invention.

Referring to FIG. 4 which is a perspective view illustrating the antenna in the embodiment of the present invention. As shown in the figure, the resonance branch 12 and the radiating body 11 may be not in a same plane, for example, the plane in which the resonance branch 12 is located is vertical to the plane in which the radiating body 11 is located.

From the above-described technical solution, by arranging the gap for spreading the width of frequency band in the radiating body of the antenna, the gay may increase a current path of an induced current in the radiating body, which increases a frequency width of the antenna effectively. Furthermore, both terminals of the gap may bend, so that there is a Common Mode (CM) radiation at 900 MHz in the antenna and a Differential Mode (DM) radiation at 1800 MHz. Further, a resonance circuit is arranged at one side of the radiating body, for example, by arranging a match resonance branch of 1800 MHz, so that an antenna matching depth of the antenna is increased throughout a high frequency band of 1710~2170 MHz, thus the requirement of 30% for the radiation efficiency of the antenna could be satisfied even when the height size of the antenna is smaller than 7 mm.

Of course, those skilled in the art can understand that the above structure in the antenna may be used in connection with the configurations of the antenna in the first embodiment or the second embodiment of the present invention, or be used alone. That is to say, an antenna having the above-described structure may be arranged on the outer surface of the housing of the mobile device as an external antenna disclosed in the previous embodiments, and also may be arranged inside the housing of the mobile device to replace an internal antenna utilized by the mobile device in the prior art. The embodiments of the present invention do not intend to set any limitations on it.

Figure 5:
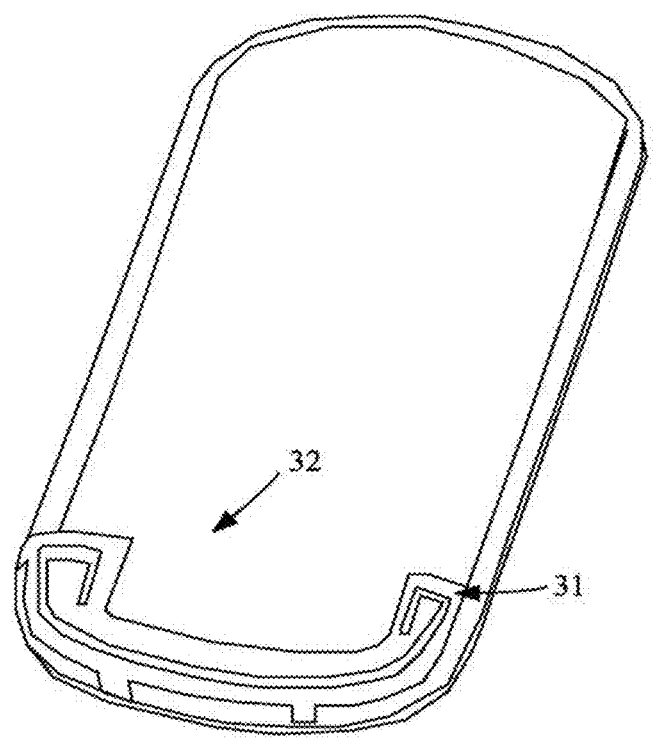
FIG. 5 is a perspective view illustrating the mobile device in the third embodiment of the present invention.

Referring to FIG. 5 which is a perspective view illustrating the mobile device in the third embodiment of the present invention. As shown in the figure, the mobile device comprises: a housing (not shown in the figure); a metal frame with a reference ground and a wireless module for providing and processing wireless signals which are arranged inside the housing, respectively, the wireless module is connected with the antenna 31, wherein, as described above, the antenna 31 may be arranged inside the housing and also may be arranged outside the housing. However, the antenna 31 is shown as being arranged on the outer surface of the housing of the mobile device in the third embodiment of the present invention, and the antenna 31 may be arranged one terminal part 32 of the mobile device.

The above antenna 31 comprises:

a radiating body including a first radiating part, a second radiating part and a connection part, wherein a first terminal of the connection part is connected to the first radiating part, a second terminal of the connection part is connected to the second radiating part, and the connection part is slotted to form a gap for spreading width of frequency band.

In this embodiment, the gap extends into the first radiating part and the second radiating part, and one terminal of the gap bends in the first radiating part while the other terminal of the gap bends in the second radiating part, which causes a Common Mode (CM) radiation at 900 MHz and a Differential Mode (DM) radiation at 1800 MHz in the low-profile broadband antenna.

a resonance branch, one terminal of the resonance branch is connected to the radiating body, and the resonance branch and the radiating body are not in a same plane. The resonance branch is used for improving antenna matching and an impedance of the antenna, so that the radiating body is more suitable to radiate.

In this embodiment, the resonance branch may be a match resonance branch of 1800 MHz.

a ground part connected with the radiating body, one terminal of the ground part is connected to the radiating body and the other terminal of the ground part is connected to a reference ground, and the reference ground is closed to a power feeding part. When coaxial cables are used to feed power, internal conductors in the coaxial cables are connected to the power feeding part, while external conductors therein are connected to a point having a closest distance from the power feeding part on the reference ground; and the power feeding part connected with the radiating body, and the wireless module is connected to the radiating body through the power feeding part.

In this embodiment, the ground part and the power feeding part are connected with the connection, respectively, and both the power feeding part and the ground part are arranged at the same side of the connection part. For example, when the mobile device is a mobile phone, the antenna may be arranged at one terminal part of the mobile phone. Referring to FIG. 5, the shape of the radiating body of the antenna is configured as concave, so a SIM card slot and a speaker may be arranged at middle of the concave radiating body, so that the SIM card slot and the speaker are far away from the first radiating part and the second radiating part, that is, the radiating body is configured as being far away from ferromagnetic substance of the speaker in the mobile phone. Additionally, there is a exactly entire reference ground below the low-profile broadband antenna, so that the radiation efficiency of the antenna can be ensured without hollowing a ground in the prior art.

Figure 6:
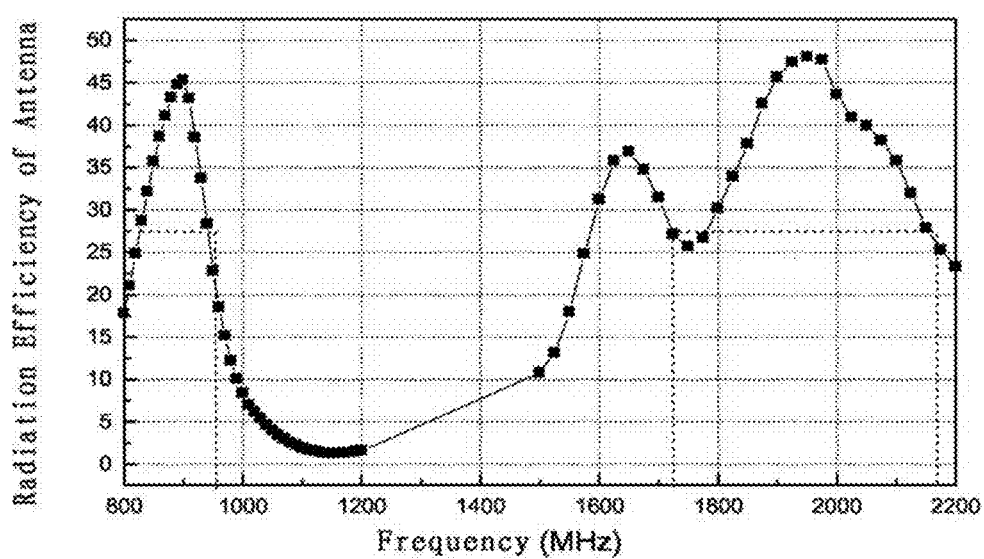
FIG. 6 is a schematic view illustrating a relationship between a radiation efficiency of the antenna and the frequency in the third embodiment of the present invention.

As shown in FIG. 6 which is a schematic view illustrating a relationship between a radiation efficiency of the antenna and the frequency in the third embodiment of the present invention. When the height size of the antenna is 5~7 mm and the antenna is just closed to the speaker and the SIM card slot, a scope of the frequency band of the antenna may be up to 820~960 MHz and 1710~2170 MHz in a case that the radiation efficiency of the antenna reaches to 30% by using the antenna according to the embodiments of the present invention, so that a mobile terminal equipped with the antenna may be applicable to all of existing 3G frequency band in the world and the mobile terminal may realize a global usage indeed.

Figure 7:
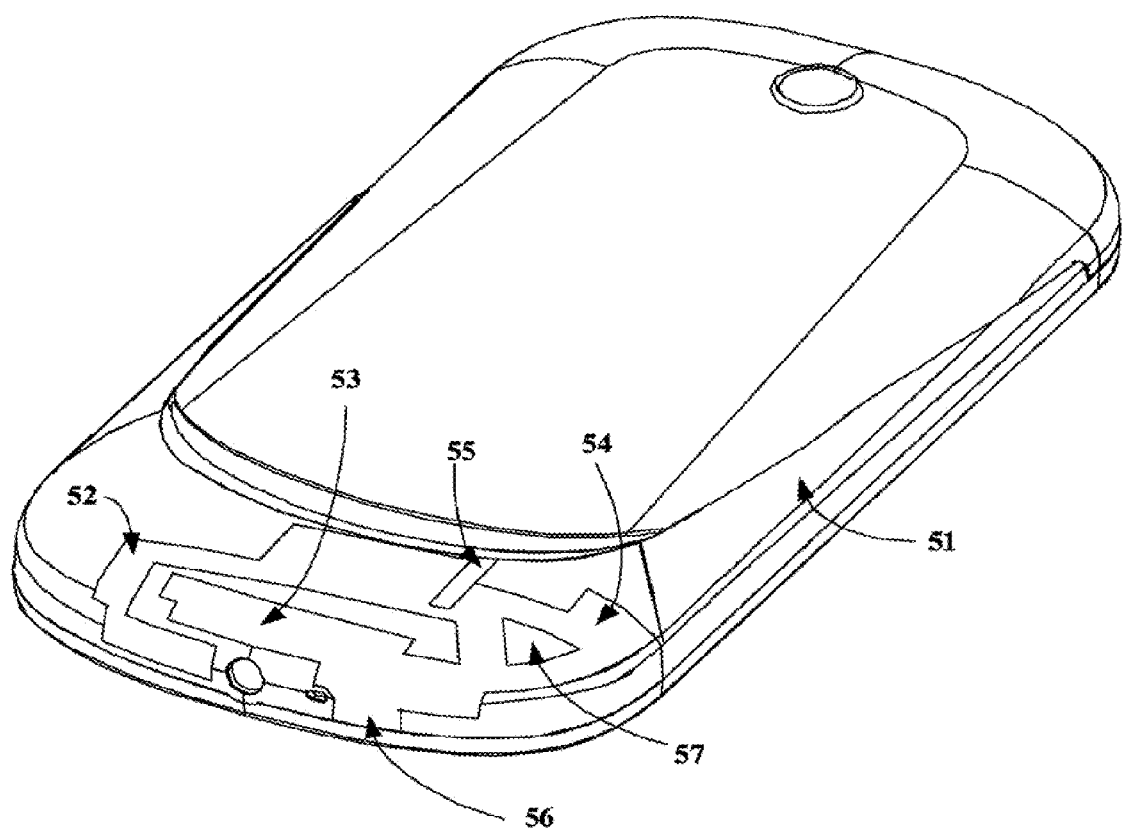
FIG. 7 is a perspective view illustrating a mobile device in a fourth embodiment of the present invention.
Figure 8:
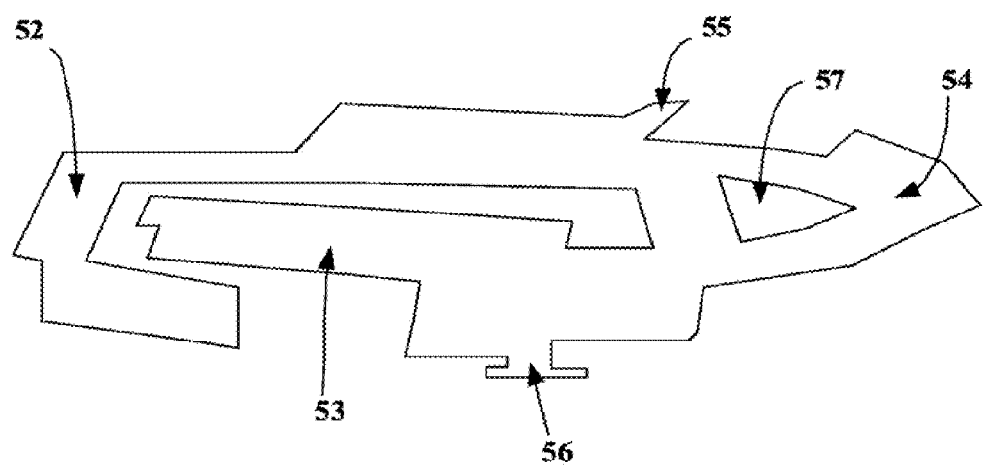
FIG. 8 is a perspective view illustrating the antenna in the fourth embodiment of the present invention.

Referring to FIG. 7 and FIG. 8, a mobile device in a fourth embodiment of the present invention comprises:

a housing 51;

a wireless module (not shown in the figures) arranged inside the housing, which used for providing and processing wireless signals;

an antenna arranged on an outer surface of the housing, which is connected with the wireless module, wherein the antenna comprises:

- a first resonance part 52, one terminal of the first resonance part 52 may be bent in this embodiment;
- a second resonance part 53;
- a connection part 54 which is connected with the first resonance part 52 and the second resonance part 53, respectively;
- a power feeding part 55 connected with the first resonance part 52;
- a ground part 56 connected with the second resonance part 53; and
- a reference ground connected with the ground part 55.

In this embodiment, a first gap 57 which is hollow and used for spreading width of frequency band is arranged on the connection part 54.

By arranging the gap for spreading the width of frequency band in the antenna, the gap may increase a current path of an induced current in the first resonance part and the second resonance part, which increases a frequency width of the antenna effectively.

In the prior art, the first method for increasing the radiation efficiency of the antenna is to increase a size of the height of the antenna, but the first method would destroy an original appearance and structure. The second method uses the PIFA antenna (Planner Inverted-F Antenna) above-described or a MONO-POLE antenna and adjusts a match circuit. However, due to characters in structures of the PIFA or MONO-POLE per se, the antenna in the second method has a height below 5~7 mm and the radiation efficiency of the antenna also fails to reach the requirements. Therefore, the requirement of 30% for the radiation efficiency of the antenna could not be satisfied when the height size is 5~7 mm by using the antenna structure in the prior art. The embodiments of the present invention have advantages as follows, as compared with the prior art.

1. By arranging the gap for spreading the width of frequency band in the radiating body of the antenna, the gap may increase a current path of an induced current in the radiating body, which increases a frequency width of the antenna effectively.

2. Both terminals of the gap may bend in the first radiating part and the second radiating part, respectively, so that there is a Common Mode (CM) radiation at 900 MHz in the antenna, while a Differential Mode (DM) radiation at 1800 MHz. Further, a resonance branch is arranged at one side of the radiating body, for example, by arranging a match resonance branch of 1800 MHz connected with the first radiating part, so that an antenna matching depth of the antenna is increased throughout a high frequency band of 1710~2170 MHz, thus the requirement of 30% for the radiation efficiency of the antenna could be satisfied even when the height size of the antenna is smaller than 7 mm.

3. In a case that the radiation efficiency of the antenna reaches to 30%, a scope of the frequency band of the antenna may be up to 820~960 MHz and 1710~2170 MHz, so that a mobile terminal equipped with the antenna may be applicable to all of existing 3G frequency band in the world and the mobile terminal may realize a global usage indeed.

Above are shown a case where the antenna structures in the third embodiment, the fourth embodiment of the present invention are used in connection with the configurations of arranging the antenna of the mobile device on the outer surface of the housing of the mobile device in the first embodiment, the second embodiment of the present invention. While increasing the height of the antenna and enhancing the performance of the antenna by arranging the antenna of the mobile device on the outer surface of the housing of the mobile device, the radiation efficiency of the antenna may be further increased by utilizing the antenna structures in the third embodiment, the fourth embodiment of the present invention, so that the antenna performance of the PIFA antenna is increased markedly.

Of course, as stated previously, the antenna structures in the third embodiment, the fourth embodiment of the present invention and the configurations of arranging the antenna of the mobile device on the outer surface of the housing of the mobile device in the first embodiment may be used separately. The antenna structures as described in the third embodiment, the fourth embodiment of the present invention can be applied to both an external antenna and an internal antenna, both a PIFA antenna and other types of antenna. The embodiments of the present invention do not intend to set any limitations on it.

The above described is only preferable embodiments of the present invention but not intends to limit the present invention in form. Although the present invention is disclosed by those preferable embodiments, it is not limited to those embodiments. Those ordinary skilled in the art may make many possible changes and amendments in the solutions of the present invention with the methods and technical contents disclosed above, or amend them as equivalent embodiments which are varied equivalently. Therefore, all such modifications, equivalent varieties and amendments according to the spirit of the present invention are intended to be included within the scope of the present invention without departing from the contents in the solutions of the present invention.

What is claimed is:

1. A mobile terminal, comprising:
a housing;
a main board arranged inside the housing; and
an antenna arranged on an outer surface of the housing and connected with the main board, wherein the antenna comprises a radiating body including a first radiating part, a second radiating part and a connection part, wherein a first terminal of the connection part is connected to the first radiating part, a second terminal of the connection part is connected to the second radiating part, and the connection part is slotted to form a single gap for spreading width of frequency band, wherein the gap extends into the first radiating part and the second radiating part, and the gap includes a first terminal that bends to form a first U shape in the first radiating part and a second terminal that bends to form a second U shape in the second radiating part such that there is a common mode radiation in a first frequency band and a differential mode radiation in a second frequency band, wherein the first and second terminals of the gap bends and points towards itself, and the first and second radiating parts extend perpendicular to the connection part.

2. A mobile terminal as claimed in claim 1, further comprising a through-hole arranged on the housing at a position that corresponds to that of an antenna feed point, and the antenna is connected to a communication module on the main board through the through-hole.

3. A mobile terminal as claimed in claim 1, wherein the antenna is formed by hollow carving an outer surface of the housing, when the housing is metal.

4. A mobile terminal as claimed in claim 1, wherein the antenna is formed by electroplating the outer surface of the housing, when the housing is non-metal.

5. A mobile terminal as claimed in claim 1, further comprising a groove with a shape of the antenna and being injection-molded on the outer surface of the housing with the antenna being inlayed into the groove, when the housing is non-metal.

6. A mobile terminal as claimed in claim 1, further comprising a covering film arranged on the outer surface of the antenna.

7. A mobile terminal as claimed in claim 1, further comprising paint sprayed on the outer surface of the antenna.

8. A mobile terminal as claimed in claim 6, wherein the covering film is stuck to the outer surface of the antenna by insert mold bonding.

9. A mobile terminal as claimed in claim 6, wherein a thickness of the covering film is 0.2 mm-0.25 mm.

10. A mobile terminal as claimed in claim 6, wherein material for the covering film is a polycarbonate, a polyethylene glycol two ester or a polyurethane.

11. A mobile terminal as claimed in claim 1, wherein the antenna further comprises:
a ground part arranged on the radiating body;
a power feeding part arranged on the radiating body; and
a reference ground connected with the ground part.

12. A mobile terminal as claimed in claim 11, wherein the antenna further comprises a resonance branch, and one terminal of the resonance branch is connected to the radiating body.

13. A mobile terminal as claimed in claim 12, wherein the resonance branch is connected to the first radiating part.

14. A mobile terminal as claimed in claim 13, wherein the resonance branch is a match resonance branch of 1800 MHz.

15. A mobile terminal as claimed in claim 11, wherein the radiating body has a shape of concaveness.

16. An antenna of a mobile terminal, comprising:
a radiating body including a first radiating part, a second radiating part and a connection part, wherein a first terminal of the connection part is connected to the first radiating part, a second terminal of the connection part is connected to the second radiating part, and the connection part is slotted to form a gap for spreading width of frequency band;
a ground part arranged on the radiating body;
a power feeding part arranged on the radiating body; and
a reference ground connected with the ground part, wherein the gap extends into the first radiating part and the second radiating part, and the gap includes a first terminal that bends to form a first U shape in the first radiating part and a second terminal that bends to form a second U shape in the second radiating part such that there is a common mode radiation in a first frequency band and a differential mode radiation in a second frequency band, wherein the first and second terminals of the gap bends and points towards itself, and the first and second radiating parts extend perpendicular to the connection part.

17. A mobile terminal comprising a housing, a reference ground and a wireless module for providing and processing wireless signals which are arranged inside the housing, respectively, the mobile terminal further comprises: an antenna arranged on the housing, which is connected with the wireless module, wherein the antenna comprises:
a radiating body including a first radiating part, a second radiating part and a connection part, a first terminal of the connection part is connected to the first radiating part, a second terminal of the connection part is connected to the second radiating part, and the connection part is slotted to form a single gap for spreading width of frequency band;
a ground part connected with the radiating body, and the reference ground is connected with the ground part; and
a power feeding part connected with the radiating body, and the wireless module is connected to the radiating body through the power feeding part, wherein the gap extends into the first radiating part and the second radiating part, and the gap includes a first terminal that bends to form a U shape in the first radiating part and a second terminal that bends to form a U shape in the second radiating part such that there is a common mode radiation in a first frequency band and a differential mode radiation in a second frequency band, wherein the first and second terminals of the gap bends and points towards itself, and the first and second radiating parts extend perpendicular to the connection part.

18. A mobile terminal as claimed in claim 17, wherein the antenna further comprises a resonance branch and one terminal of the resonance branch is connected to the radiating body.

19. A mobile terminal as claimed in claim 18, wherein the resonance branch is a match resonance branch of 1800 MHz.

20. A mobile terminal, comprising:
a housing;
a wireless module arranged inside the housing, which used for providing and processing wireless signals;
an antenna arranged on an outer surface of the housing, which is connected with the wireless module, wherein the antenna comprises:
a first resonance part;
a second resonance part;
a connection part which is connected with the first resonance part and the second resonance part;
a power feeding part connected with the first resonance part;
a ground part connected with the second resonance part; and
a reference ground connected with the ground part, wherein a first gap which is hollow and used for spreading width of frequency band is arranged on the connection part, wherein the gap extends into the first resonance part and the second resonance part, and the gap includes a first terminal that bends to form a U shape in the first resonance part and a second terminal that bends to form a U shape in the second resonance part such that there is a common mode radiation in a first frequency band and a differential mode radiation in a second frequency band, wherein the first and second terminals of the gap bends and points towards itself, and the first and second radiating parts extend perpendicular to the connection part.

\* \* \* \* \*